(12) United States Patent
Friedrich et al.

(10) Patent No.: US 7,463,149 B2
(45) Date of Patent: Dec. 9, 2008

(54) TRANSMISSION OF DATA INTO AND OUT OF AUTOMATION COMPONENTS

(75) Inventors: Wolfgang Friedrich, Bubenreuth (DE); Bernd Opgenoorth, Nürnberg (DE); Joachim Scharnagl, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 342 days.

(21) Appl. No.: 11/244,780

(22) Filed: Oct. 6, 2005

(65) Prior Publication Data

US 2006/0244565 A1  Nov. 2, 2006

(30) Foreign Application Priority Data

Oct. 15, 2004  (DE)  .................. 10 2004 050 383

(51) Int. Cl.
*G08B 13/14* (2006.01)

(52) U.S. Cl. .................................. 340/572.1; 340/10.1

(58) Field of Classification Search ............... 340/572.1
See application file for complete search history.

(56) References Cited

U.S. PATENT DOCUMENTS

| | | | | |
|---|---|---|---|---|
| 6,046,676 | A * | 4/2000 | Ward et al. ................ | 340/572.1 |
| 6,346,886 | B1 * | 2/2002 | De La Huerga .......... | 340/573.1 |
| 6,998,983 | B2 * | 2/2006 | Charych et al. .......... | 340/572.8 |
| 7,054,395 | B2 * | 5/2006 | Azakami et al. ............ | 375/345 |
| 7,148,806 | B2 * | 12/2006 | Anttila et al. ............ | 340/573.1 |
| 2004/0176143 | A1 | 9/2004 | Willins et al. | |

* cited by examiner

*Primary Examiner*—George A Bugg

(57) ABSTRACT

The invention relates to an automation system in which automation components (1) have integrated RFID tags (2) with a memory (3) for storing identification and operating data. The automation components further feature integrated RFID write/read devices (4), which can write current operating and process data onto the RFID tag (2) and can read data from the RFID rag (2). Furthermore, a mobile RFID write/read device (5) is provided, with the aid of which the data can be read out from the RFID tag (2) of the automation component (1) and/or data can be entered into the component.

5 Claims, 4 Drawing Sheets

TRANSMISSION OF DATA INTO AND OUT OF AUTOMATION COMPONENTS

CROSS REFERENCE TO RELATED APPLICATIONS

This application claims priority to the German application No. 10 2004 050 383.4, filed Oct. 15, 2004 and which is incorporated by reference herein in its entirety.

FIELD OF INVENTION

The application relates to an automation system having at least one automation component, into which and out of which data is transmitted by means of an RFID write/read device.

SUMMARY OF THE INVENTION

Within the scope of an automation system, data is generally transmitted into and out of a very wide variety of automation components. Automation components can for instance be programmable controllers, numerical controllers, field bus components of the local periphery or also field devices. The data, for instance identification data, which is securely stored on the respective automation component or also parameterization data as well as operating data is generally transmitted via a direct, electrical connection, for instance Profibus or Ethernet. A wireless transmission of data is also possible via W-LAN.

Nevertheless, in all these cases, a network must be present with corresponding hardware for this data transmission. In the event of a data transmission via a bus system and/or an ethernet, cabling of the entire automation system and/or the system to be automated must be guaranteed. In the case of the wireless data transmission via a W-LAN, the corresponding transmit and receive devices must be installed. Furthermore, a so-called engineering system is needed e.g. for setting up and parameterizing this otherwise conventional data transmission.

The provision of an infrastructure of this type for data transmission between the individual automation components involves a great deal of effort and results in considerable costs.

An engineering system suited to the version of the respective automation components is generally required for the determination of this data, identification data, parameterization data and operating data for instance.

The object of the present invention is to enable a simple transmission of data into and out of automation components, for which no additional network components (hardware and software) or engineering system are required.

The invention is achieved by means of an automation system comprising at least one automation component, in particular programmable controller, numerical controller, field bus component and/or field device, with an RFID tag for storing data and a first RFID write/read device for inputting and/or reading out data of the automation component, in particular parameterization data, operating data and/or process data into and/or out of the RFID tag and at least one mobile/external RFID write/read device for inputting and/or reading out data into and/or out of the RFID tag.

The invention is based on the knowledge that within the scope of an automation system, an increased number of intelligent automation components, which generate and receive data from the automation system, are used nowadays. An expensive bus system or Ethernet or also a wireless connection, such as a W-LAN for instance, is generally selected for instance for the data transmission. In these cases, an expensive installation of the corresponding communication system is needed. The use of RFID tags and/or RFID chips, in other words radio labels, which can store data, can dispense with the costly installation of the communication network. The data, for instance identification data or current operating and/or process data can be written by the respective automation component, for instance a controller or also a field device, via an RFID write/read device integrated into the automation device onto an RFID Tag integrated into the automation component, and/or securely linked thereto. In addition, identification data entered permanently at the factory can be stored on the RFID tag integrated into the automation component and/or securely linked thereto. The data entered and stored directly by the automation component and/or other automation components into the RFID tag can be subsequently read out via a mobile/external RFID write/read device.

The advantage here is that, unlike other communication methods, no further infrastructure is required. The only requirement here is a portable RFID write/read device, which is able to read out stored information from the automation device and/or from the RFID-tag. In this way, the data can be read out of the automation component in a simple and cost-effective manner. In this connection, in less powerful automation components which do not produce their own data which has to be stored, only an RFID tag, in other words a memory device can be integrated and/or securely applied. Only identification data which is inserted on the factory side is contained on this memory device.

One advantage with the use of RFID radio sensors for communication lies in the fact that data can be transmitted by means of mobile read/write devices on each position on the automation system without the use of a suitable engineering system and without a communication device. This is particularly advantageous in the case of a very widely distributed automation structure or also with automation systems whereby individual components are frequently reconfigured in relation to their spatial position, so that the installation of a communication network is extensive and costly.

Further advantageous embodiments of the invention are shown in the dependent claims.

It is possible, particularly with a mobile RFID read/write device and also with further automation components which are provided in the scope of the automation system, to read out the corresponding data in each instance and thus to use a mutual data transmission between the individual components of the automation system. A data exchange virtually takes place between the individual automation components by means of the RFID write/read device.

In the case of commissioning and/or with servicing or maintenance, information or data can be advantageously read by automation components or inserted there without direct, wired connection and without the use of an engineering tool by means of an RFID write/read device. For example, if a component is commissioned without connecting an engineering system, specific parameters can be changed or adapted or data which is important for commissioning, e.g. a serial number or the type of the hardware used and/or the version of the firmware present or the version of the user software can be read out. In the case of maintenance work, important information, such as firmware version, hardware type etc, can be read out for instance without a connected engineering tool. This considerably simplifies the replacement of spare parts and ensures right from the outset that certain faults cannot appear.

The information read out from the automation component is thus helpful for start-up and upgrading. Important information about the components to be upgraded can be ascertained without an engineering tool and also important information regarding the adjacent components can be learned. Maintenance data (e.g. data and/or scope of the maintenance or who has carried out the maintenance) can be transmitted in this manner onto the corresponding automation component. The data can then either be read out again via an external RFID write/read device as well as by the controller and/or automation component via the integrated RFID write/read device and is then forwarded by this to a higher-level MES system. The data read out via the RFID write/read device can be subsequently entered and/or imported into another system, e.g. a MES system or an ERP system. This enables an omission and/or error which can occur for instance in the case of a double entry to be prevented. All in all, a simple and secure data transmission can be ensured in the automation system environment with the aid of the system according to the invention.

A further advantageous application of the invention is possible for instance within the scope of an augmented reality system. In this case, a head-mounted display or a portable computer device, which displays augmented data in each instance for a user, has an integrated RFID write/read device. Data can be transmitted to an automation component via its RFID tag and/or data can also be received by an automation component via the RFID write/read device integrated in the head-mounted display. The data received via the RFID write/read device can be subsequently shown to the user in its augmented reality. In this way, in the scope of an augmented reality system, the data to be augmented can be displayed in a simple manner without using a standard communication device such as a bus system or an Ethernet for instance.

The invention is described in further detail below with reference to the exemplary embodiments shown in the figures.

DETAILED DESCRIPTION OF THE INVENTION

Figure 1:
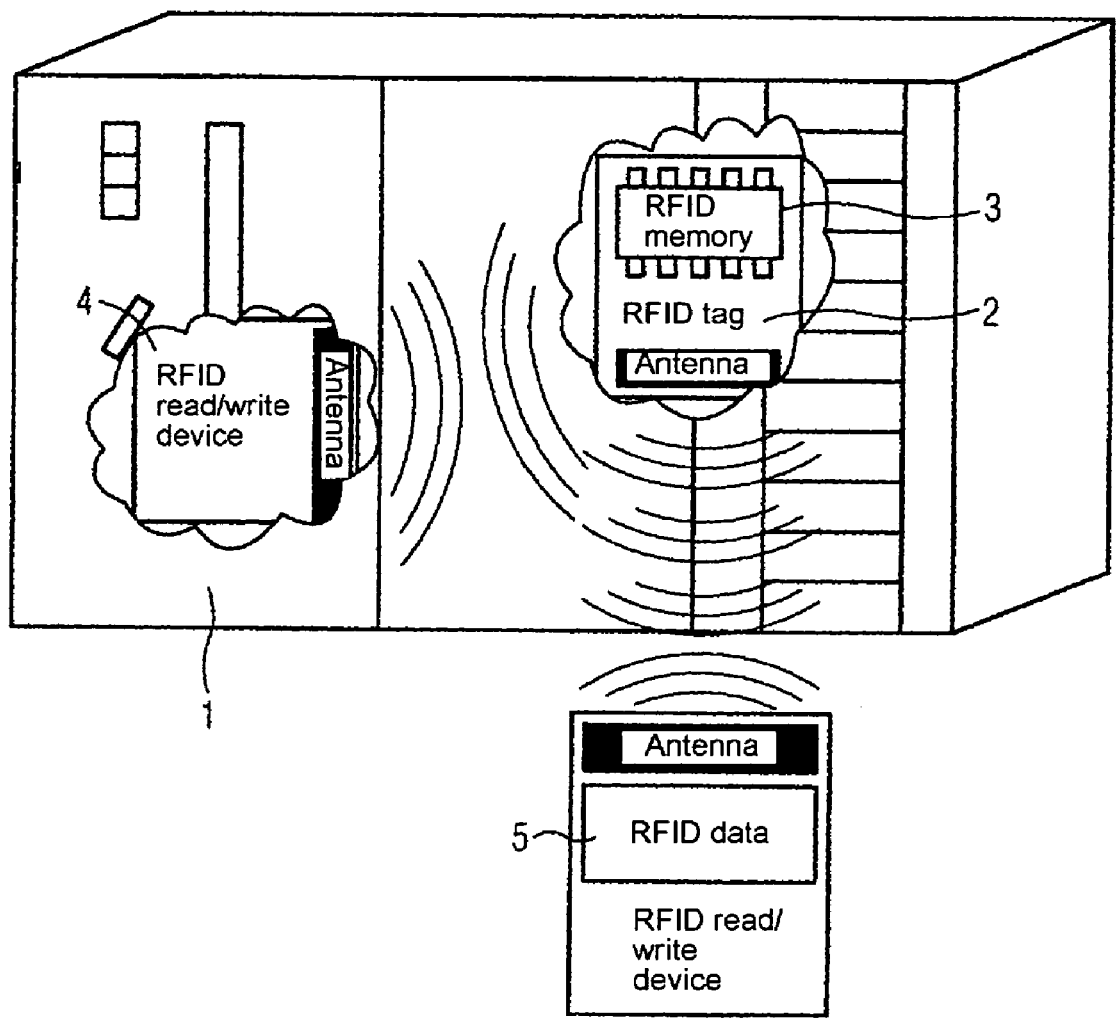
FIG. 1 shows an automation component with an RFID tag and integrated RFID write/read device and a mobile/external RFID write/read device.

FIG. 1 shows an automation component 1 of an automation system. The automation component 1 can be a programmable controller, a numerical controller, a device of the local periphery or also a field device. The automation component 1 has an RFID tag 2. The RFID tag 2 is securely attached to the automation component 1. In addition, the automation component 1 has an RFID write/read device 4. The RFID write/read device 4 is permanently integrated into the automation component 1. The RFID tag 2 has an RFID memory 3. Identification data which has been entered at the factory can be stored securely in the RFID memory 3. The automation component 1 can enter further data, e.g. parameterization data, current operating and process data etc. into the integrated RFID tag 2 by means of the RFID write/read device 4. Furthermore, additional information or also parameterization data from the RFID tag 2 can be read out from the memory (RFID memory 3) of the RFID tag 2 by means of the RFID write/read device 4.

Within the scope of the automation system, a mobile, external RFID write/read device 5 is further used to enter and/or read out data. Data can be virtually read out from the automation device and/or component 1 via the RFID memory 3 by means of the mobile RFID read/write device 5. Here permanently-entered data, as well as the data entered into the RFID tag 2 by the CPU of the automation component 1 can be read out. Similarly, data can be entered into the RFID tag 2 by means of the mobile RFID read/write device 5. This data entered here can be subsequently evaluated by the CPU of the automation component 1. The use of the RFID technology enables data transmission without an electrical connection (Profibus, Ethernet etc.), between the automation component 1 and external write/read device 5. The use of an engineering tool which would otherwise be necessary can be dispensed with in this case.

Figure 2:
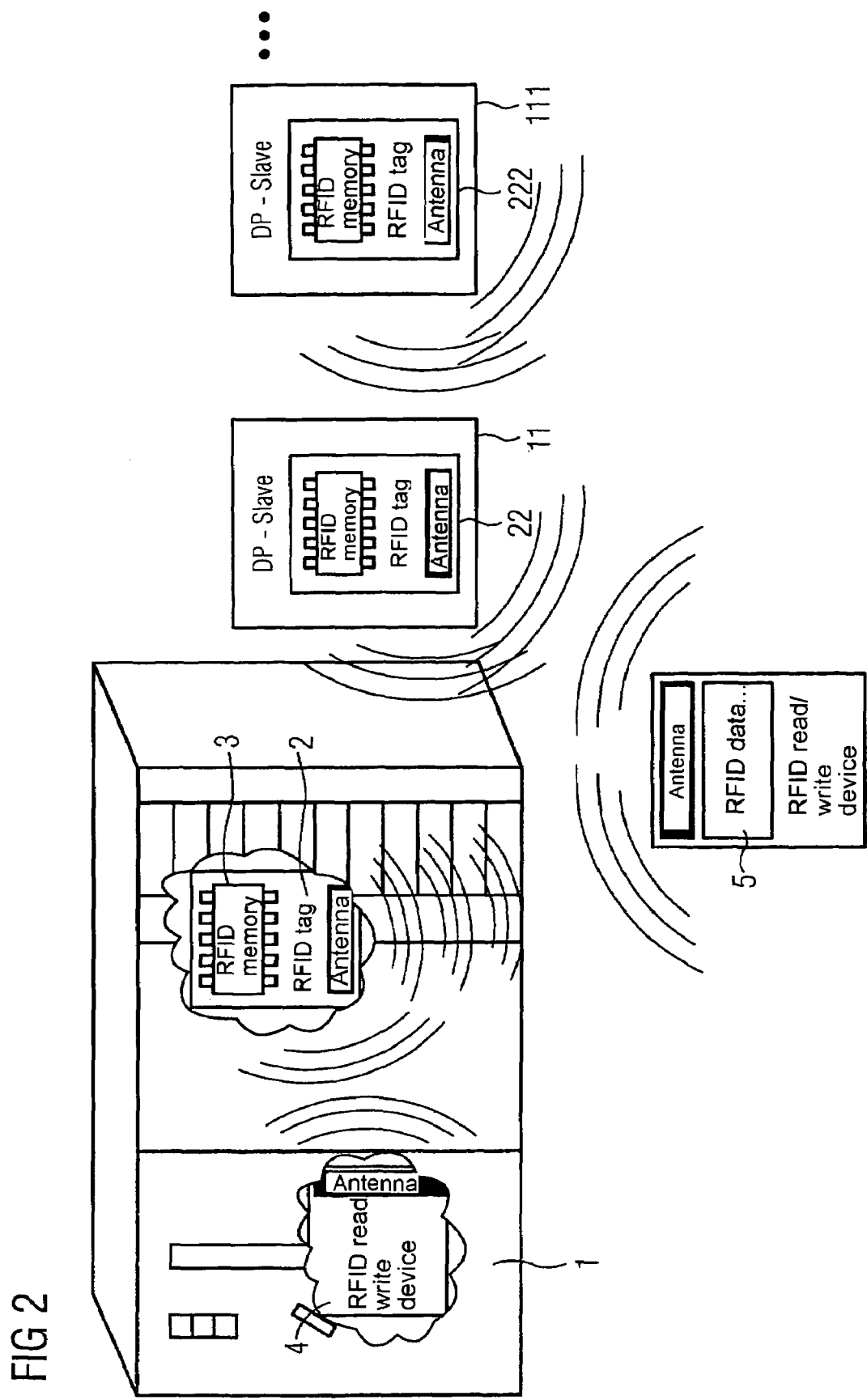
FIG. 2 shows an automation component with an RFID tag and integrated RFID write/read device and in addition a number of automation components with RFID tags and a mobile/external RFID write/read device.

FIG. 2 shows a further exemplary embodiment, with further automation components 11, 111 having an RFID tag 22, 222 in each instance. By way of example, the RFID tags are securely integrated and/or securely attached to the outside of the automation components 11, 111. If further automation components 11, 111 are in the range of the RFID write/read device 4, the automation component 1, which also has an integrated RFID write/read device to the further devices 11, 101, can transmit and/or read data therefrom without direct connection. In this case transmission takes place via the mobile RFID read/write device 5 or data transmission can also take place directly between the automation component 1 and the further automation components 11, 101 if further automation components 11, 111 are within range, in that the integrated RFID write/read device 4 writes data directly onto the further automation components 11, 101 and/or into the RFID tag 22, 222 of the automation component.

Figure 3:
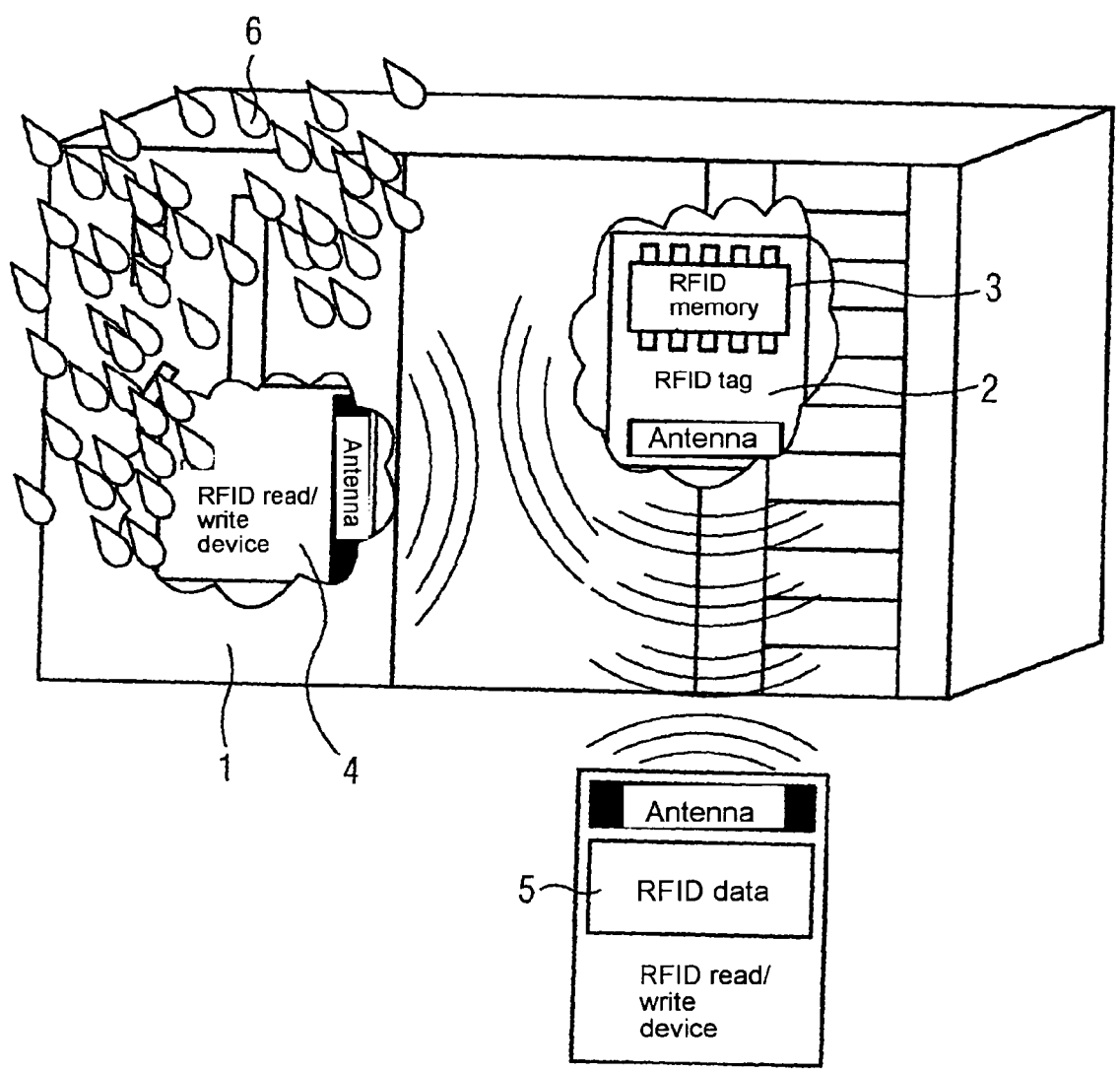
FIG. 3 shows a corresponding automation component in inhospitable surroundings.

FIG. 3 shows an automation component 1 during operation in inhospitable surroundings 6. In surroundings of this type, a housing protection IP 67 (dust-tight and short-term watertight) and/or IP 68 (dust-tight and submersible) must be provided for instance. In the case of a housing protection of this type, a data exchange can take place independently of normal operation (e.g. for diagnosis, maintenance) by means of RFID technology without an additional wired connection, which would also have to be IP 67/68. Equipping the automation component 1 with an RFID write/read device and/or an RFID tag 2 allows data transmission to the mobile RFID write/read device 5 without the need for cabling. This guarantees data transmission without significant expense and makes it possible to reduce the costs of exchanging data in outdoor applications.

Figure 4:
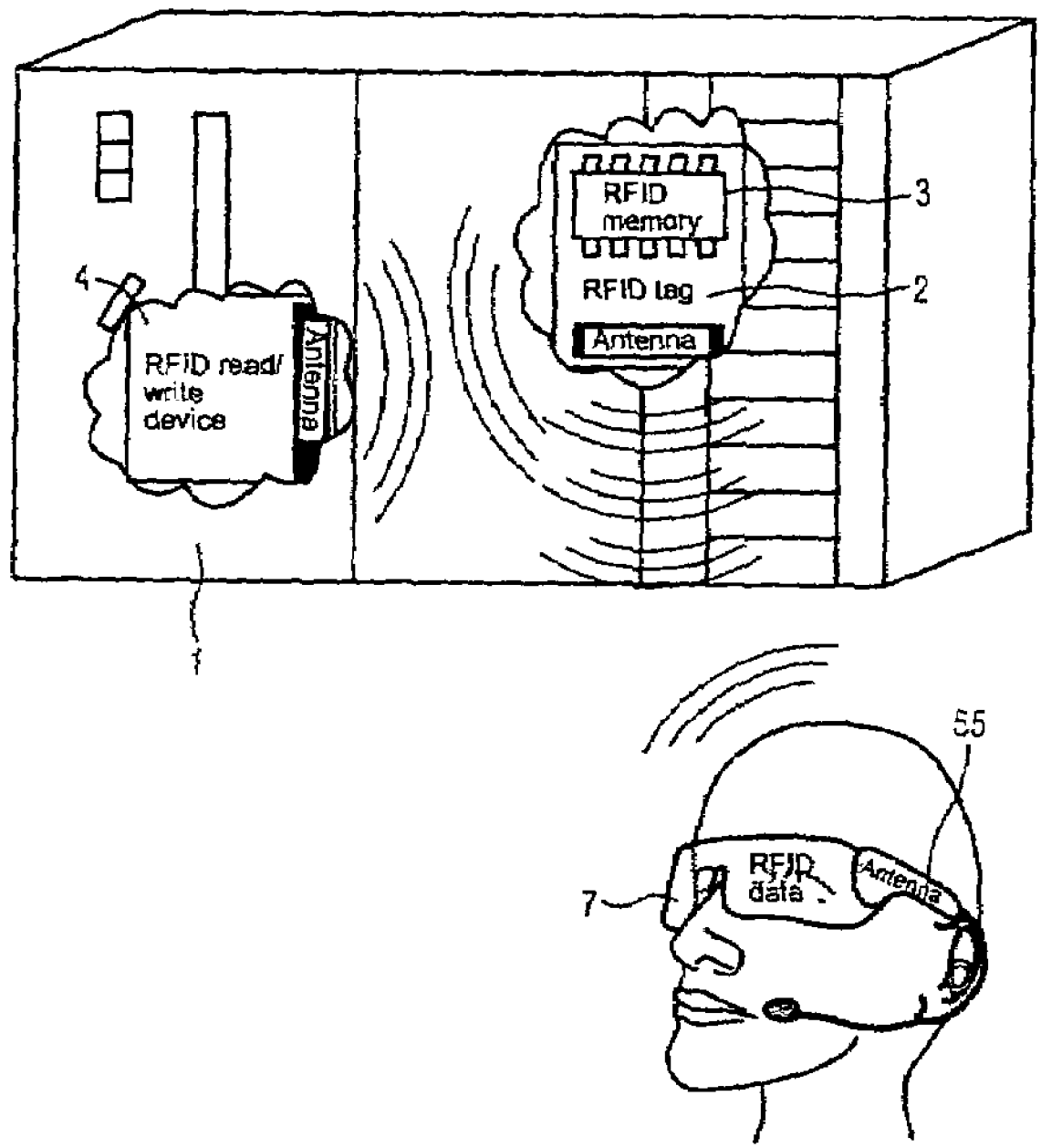
FIG. 4 shows an automation component with an RFID tag and data transmission to an augmented reality system using RFID technology.

FIG. 4 shows an application, with which the mobile RFID write/read device 5 is integrated into an augmented reality system and/or a head-mounted display 7. In this application, data from the automation component 1 can be entered into the RFID tag 2 and/or its memory 3 by means of the RFID write/read device 4. The data entered can be directly transmitted to a user by means of the mobile RFID read/write device 55 integrated in the head-mounted display 7. The transmitted data can then be displayed on the head-mounted display within the scope of an augmented reality system. The RFID data from the automation component 1 can thus be integrated and/or augmented into the field of vision of the user without a further network. The data stored in the RFID tag 2 can thus be directly used for the augmented reality system. In addition, data which is required in a specific operating step in the augmented reality procedure in the automation component, e.g. parameterization data etc, is automatically transmitted to the automation component 1 by an Augmented Reality tool and/or by a head-mounted display. On the one hand this means that user does not have to transmit/enter any data by hand and on the other hand, the errors caused by incorrect manual entry are eliminated. Data which was input and/or resulted from the converted and/or interpreted voice entries of the augmented reality user via the microphone 8 can be similarly transmitted into the memory 3 of the automation component 1 by means of RFID technology.

The invention claimed is:

1. An automation component, comprising:
a RFID tag for storing data; and
a first RFID write/read device for a wireless data communication with the RFID tag, wherein the automation component is provided for communication with an RFID write/read device integrated in a head-mounted display and a portable computer device of an augmented reality system, wherein the data received by the automation component via the integrated RFID write/read device is provided for display in an augmented reality of a user.

2. The automation component according to claim 1, wherein the first RFID write/read device is integrated into the automation component and the RFID tag is integrated into the automation component and is securely attached to the automation component from the outside.

3. The automation component according to claim 1, wherein the RFID tag is adapted for storing permanent data.

4. The automation component according to claim 1, wherein the at least one mobile RFID write/read device is adapted for reading the permanent data and to the data of the automation component from the RFID tag.

5. The automation component according to claim 1, wherein the automation component is provided for communication with further automation components, and wherein the first RFID write/read device is provided to enter and output data in the RFID tag or from the REID tag of the further automation component.

* * * * *